(12) United States Patent
Lee et al.

(10) Patent No.: US 8,952,913 B2
(45) Date of Patent: Feb. 10, 2015

(54) DISPLAY DEVICE AND DRIVING METHOD THEREOF

(71) Applicant: LG Display Co., Ltd., Seoul (KR)

(72) Inventors: Young Joon Lee, Gyeonggi-do (KR); Sang Soo Hwang, Seoul (KR); Sun Yeop Kim, Seoul (KR); Sung Yub Lee, Busan (KR)

(73) Assignee: LG Display Co., Ltd., Seoul (KR)

( * ) Notice: Subject to any disclaimer, the term of this patent is extended or adjusted under 35 U.S.C. 154(b) by 137 days.

(21) Appl. No.: 13/709,268

(22) Filed: Dec. 10, 2012

(65) Prior Publication Data

US 2014/0111446 A1   Apr. 24, 2014

(30) Foreign Application Priority Data

Oct. 23, 2012   (KR) .................. 10-2012-0117795

(51) Int. Cl.
*G06F 3/041* (2006.01)
*G06F 3/044* (2006.01)

(52) U.S. Cl.
CPC ............ *G06F 3/0416* (2013.01); *G06F 3/0412* (2013.01); *G06F 3/044* (2013.01)
USPC ........................................................ 345/173

(58) Field of Classification Search
USPC ........................................................ 345/173
See application file for complete search history.

(56) References Cited

U.S. PATENT DOCUMENTS

| 7,859,521 B2 | 12/2010 | Hotelling et al. |
| 2004/0217945 A1* | 11/2004 | Miyamoto et al. ............ 345/173 |
| 2005/0286408 A1 | 12/2005 | Jin et al. |
| 2011/0157248 A1 | 6/2011 | Kang et al. |
| 2012/0086879 A1 | 4/2012 | Yu et al. |
| 2012/0105752 A1 | 5/2012 | Park et al. |
| 2012/0242597 A1 | 9/2012 | Hwang et al. |
| 2012/0256861 A1 | 10/2012 | Park |
| 2012/0262387 A1 | 10/2012 | Mizuhashi et al. |
| 2013/0293513 A1 | 11/2013 | Hotelling et al. |
| 2013/0300953 A1 | 11/2013 | Hotelling et al. |

FOREIGN PATENT DOCUMENTS

| EP | 2503435 A2 | 9/2012 |
| JP | 2008-503974 A | 2/2008 |
| JP | 2010-231773 A | 10/2010 |
| JP | 2011-527787 A | 11/2011 |
| JP | 2012-230657 A | 11/2012 |
| KR | 10-2009-0005603 A | 1/2009 |

(Continued)

*Primary Examiner* — Charles V Hicks
(74) *Attorney, Agent, or Firm* — Morgan, Lewis & Bockius LLP

(57) ABSTRACT

Disclosed is a display device. The display device includes a panel, a display driver IC, and a touch IC. The panel includes a plurality of driving electrodes and a plurality of sensing electrodes. The display driver IC outputs a common voltage to the driving electrode and the sensing electrode in a display driving interval, outputs a reference voltage to the driving electrode during a touch non-sensing period in a touch driving interval, and outputs a driving pulse to the driving electrode to receive a sensing signal from the sensing electrode during a touch sensing period in the touch driving interval. The touch IC transfers a control signal and a selection signal for selecting the touch sensing period and the touch non-sensing period to the display driver, and senses whether there is a touch with the sensing signal and the reference voltage.

8 Claims, 9 Drawing Sheets

(56) References Cited

FOREIGN PATENT DOCUMENTS

| | | |
|---|---|---|
| KR | 10-1032583 B1 | 4/2011 |
| KR | 101085086 B1 | 11/2011 |
| KR | 10-2012-0036518 A | 4/2012 |
| KR | 10-2012-0045992 A | 5/2012 |
| KR | 10-2012-0057403 A | 6/2012 |
| KR | 10-2012-0075207 A | 7/2012 |
| KR | 10-2012-0108704 A | 10/2012 |
| KR | 10-2012-0111674 A | 10/2012 |
| KR | 10-2013-0016894 A | 2/2013 |
| WO | 2004/049295 A1 | 6/2004 |

\* cited by examiner

DISPLAY DEVICE AND DRIVING METHOD THEREOF

CROSS-REFERENCE TO RELATED APPLICATIONS

This application claims the benefit of the Korean Patent Application No. 10-2012-0117795 filed on Oct. 23, 2012, which is hereby incorporated by reference as if fully set forth herein.

BACKGROUND

1. Field of the Invention

The present invention relates to a display device and a driving method thereof, and more particularly, to a display device in which a touch screen is built in a panel and a driving method thereof.

2. Discussion of the Related Art

Touch screens are a type of input device that is included in display devices such as liquid crystal displays (LCDs), field emission displays (FEDs), plasma display panels (PDPs), electroluminescent displays (ELDs), and electrophoretic displays (EPDs), and enables a user to input information by directly touching a screen with a finger, a pen or the like while looking at the screen of the display device.

Particularly, the demand of display devices with integrated in-cell type touch screen, which include a plurality of built-in elements configuring the touch screen for slimming portable terminals such as smart phones and tablet personal computers (PCs), is recently increasing.

In a related art display device with integrated in-cell type touch screen disclosed in U.S. Pat. No. 7,859,521, a plurality of common electrodes for display are segmented into a plurality of touch driving areas and touch sensing areas, thereby allowing a mutual capacitance to be generated between the touch driving area and the touch sensing area. Therefore, the related art display device measures the change in a mutual capacitance that occurs in touch, and thus determines whether there is a touch.

In other words, in the related art display device with integrated in-cell type touch screen, a plurality of common electrodes for display perform the function of a touch electrode when a panel operates in a touch driving mode, for simultaneously performing a display function and a touch function.

In a related art in-cell type mutual capacitive touch screen using the existing common electrode, a common electrode is used as a driving electrode and a sensing electrode that are necessary for touch driving, and a display driving period and a touch driving period are temporally divided. Thus, a noise component which occurs in the display driving period does not affect touch driving.

In the display driving period, a driving electrode and a sensing electrode act as a common electrode. In the touch driving period, a periodic driving pulse is applied to the driving electrode, and a touch IC determines whether there is a touch by using a sensing signal that is received through the sensing electrode.

FIG. 1 is a timing chart showing voltages which are respectively applied to a driving electrode and sensing electrode of a related art display device, and is for describing a configuration of the related art display device with integrated in-cell type touch screen.

For example, as shown in FIG. 1, in a display driving period, a common voltage Vcom of Z(V) is applied to both a driving electrode TX and a sensing electrode RX, and thus, an equal voltage is generated between the driving electrode and the sensing electrode. Therefore, an image-quality defect such as block dim due to a luminance difference between the electrodes is not caused.

However, in a touch driving period, a driving pulse that has X(V) as the maximum voltage VTX_HIGH and has Y(V) as the minimum voltage VTX_LOW is applied to the driving electrode TX, and a reference voltage VRX_REF that is a constant DC voltage R(V) is applied to a receiver of a touch IC connected to the sensing electrode RX.

Moreover, as shown in FIG. 1, the driving pulse whose the maximum voltage VTX_HIGH and the minimum voltage VTX_LOW swing is applied to the driving electrode in only a portion of the touch driving period, and the minimum voltage VTX_LOW is applied to the driving electrode in the most portions of the touch driving period.

The related art display device has the following limitations.

First, a difference between the voltage VTX_HIGH or VTX_LOW applied to the driving electrode and the voltage VRX_REF applied to the sensing electrode occurs in the touch driving period, and thus, different voltages are applied to a common electrode block (which is used as a driving electrode) and a common electrode bloc that is used as a sensing electrode in the touch driving period, causing block dim in which a luminance difference occurs between blocks in a panel.

In the panel of the related art display device with integrated in-cell type touch screen using common electrodes, the common electrodes are divided into a plurality of driving electrodes TX and a plurality of sensing electrodes RX. In the display driving period, the common voltage Vcom is applied to both the driving electrodes and the sensing electrodes. In the touch driving period, the driving pulse (VTX_HIGH and VTX_LOW) is applied to the driving electrode TX, and the reference voltage VRX_REF is applied to the sensing electrode RX.

At this point, a difference between an average voltage of the driving pulse and the reference voltage VRX_REF occurs in the touch driving period, and thus, block dim occurs between the driving electrode TX and the sensing electrode RX, causing a defective image.

Second, an amplitude A of the driving pulse applied to the driving electrode is less than the maximum amplitude (6 V) of the driving pulse, causing the degradation of touch performance. Generally, the driving pulse has a voltage difference of 6 V between the maximum voltage and the minimum voltage with respect to the common voltage of −3 V to 0 V. However, as shown in FIG. 1, since the minimum voltage VTX_LOW of the driving pulse is higher than the common voltage, the amplitude of the driving pulse is less than 6 V, causing the degradation of touch sensing performance.

SUMMARY

Accordingly, the present invention is directed to a display device and a driving method thereof that substantially obviate one or more problems due to limitations and disadvantages of the related art.

An aspect of the present invention is directed to a display device and a driving method thereof that apply a driving pulse, having a common voltage as the minimum voltage, to a driving electrode during a touch sensing period in a touch driving interval, and apply a reference voltage, which is used for touch sensing, to the driving electrode during a touch non-sensing period in the touch driving interval.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a display device including: a panel including a plurality of driving electrodes and a plurality of sensing electrodes; a display driver IC outputting a common voltage to the driving electrode and the sensing electrode in a display driving interval, outputting a reference voltage to the driving electrode during a touch non-sensing period in a touch driving interval, and outputting a driving pulse to the driving electrode to receive a sensing signal from the sensing electrode during a touch sensing period in the touch driving interval, the driving pulse swinging with respect to the reference voltage; and a touch IC transferring a control signal and a selection signal for selecting the touch sensing period and the touch non-sensing period to the display driver, and sensing whether there is a touch with the sensing signal and the reference voltage, the control signal allowing the display driver IC to sequentially output the driving pulse to the driving electrodes.

In another aspect of the present invention, there is provided a method of driving a display device which includes: outputting a common voltage to a driving electrode and a sensing electrode in a display driving interval, the driving electrode and the sensing electrode being formed in a panel; applying a reference voltage to the driving electrode during a touch non-sensing period in a touch driving interval, and outputting a driving pulse to the driving electrode to receive a sensing signal from the sensing electrode during a touch sensing period in the touch driving interval, the driving pulse swinging with respect to the reference voltage; and sensing whether there is a touch with the sensing signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of the present invention will be described in detail with reference to the accompanying drawings.

For convenience of a description, an LCD device will be described as an example of the present invention, but the present invention is not limited thereto. That is, the present invention may be applied to various display devices that display an image by using a common electrode and a common voltage.

Figure 1:
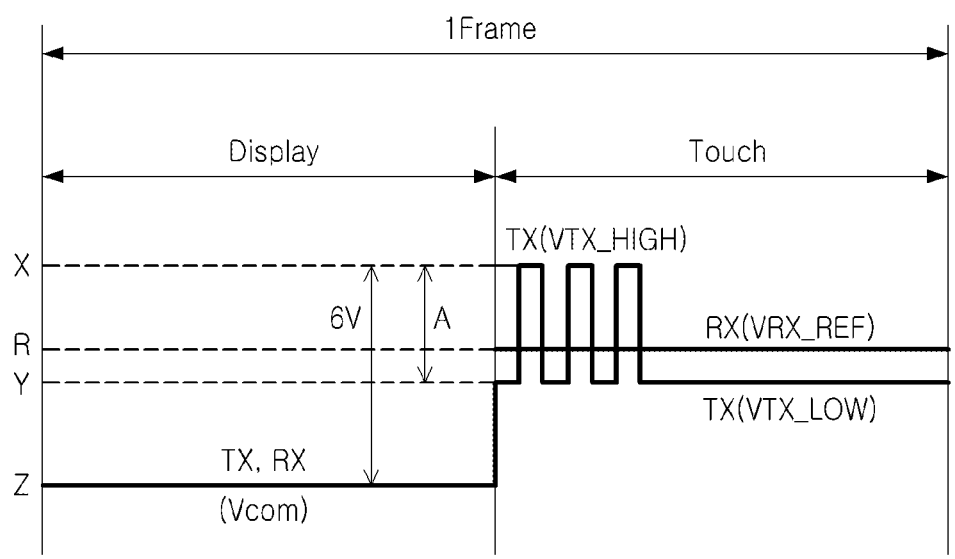
FIG. 1 is a timing chart showing voltages which are respectively applied to a driving electrode and sensing electrode of a related art display device.
Figure 2:
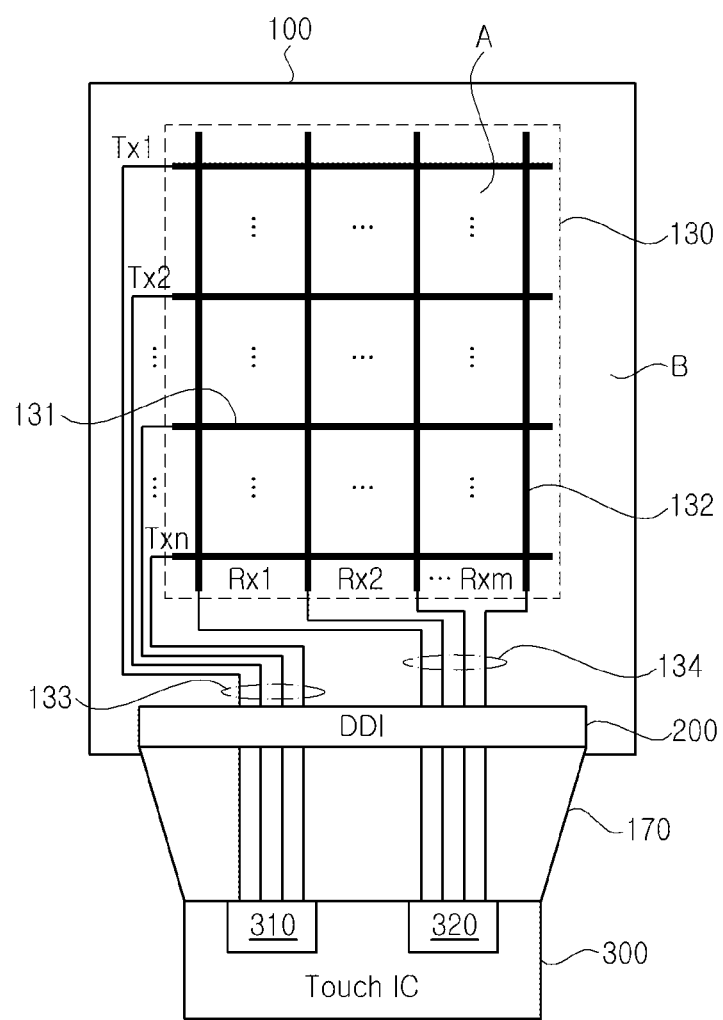
FIG. 2 is a diagram schematically illustrating a configuration of a display device according to an embodiment of the present invention.

FIG. 2 is a diagram schematically illustrating a configuration of a display device according to an embodiment of the present invention.

As illustrated in FIG. 2, the display device according to the present invention includes: a panel 100 that includes a plurality of driving electrodes 131 and a plurality of sensing electrodes 132; a display driver IC 200 that outputs a common voltage Vcom to the driving electrode 131 and the sensing electrode 132 in a display driving interval, outputs a reference voltage VRX_REF to the driving electrode 131 during a touch non-sensing period in a touch driving interval, and outputs a driving pulse (which swings with respect to the reference voltage VRX_REF) to the driving electrode 131 to receive respective sensing signals from the sensing electrodes 132 during a touch sensing period in the touch driving interval; and a touch IC 300 that transfers a control signal (which allows the display driver IC 200 to sequentially output the driving pulse to the driving electrodes 131) and a selection signal Tx_SEL for selecting the touch sensing period and the touch non-sensing period to the display driver IC 200, and senses whether there is a touch with the sensing signals and the reference voltage.

A touch screen 130, including the driving electrodes 131 and the sensing electrodes 132, is built in the panel 100.

When the display device is an LCD device, the panel 100 may include two glass substrates and a liquid crystal layer formed therebetween.

In this case, a lower substrate of the panel 100 includes a plurality of data lines, a plurality of gate lines intersecting the data lines, a plurality of thin film transistors (TFTs) that are respectively formed in a plurality of pixels defined by intersections between the data lines and the gate lines, a plurality of pixel electrodes for charging the respective pixels with data voltages, and a plurality of common electrodes for driving liquid crystal injected into the liquid crystal layer together with the respective pixel electrodes. The pixels are arranged in a matrix type by a intersection structure of the data lines and the gate lines.

A plurality of black matrixes BM and a plurality of color filters are formed in an upper substrate of the panel 100.

Polarizers POL1 and POL2 are respectively attached to the upper substrate and lower substrate of the panel 100, and an alignment layer for setting a pretilt angle of the liquid crystal is formed at an inner surface contacting the liquid crystal. A column spacer CS for maintaining a cell gap may be formed between the upper glass substrate and lower glass substrate of the panel 110.

That is, as described above, the present invention relates to an LCD device with integrated in-cell type touch screen in which the driving electrodes 131 and sensing electrodes 132 configuring the touch screen 130 are formed in an active area A of the panel 100. However, the present invention may be applied to various types of display devices driven with the common electrodes and the common voltage, in addition to the LCD device.

The touch screen 130 senses a user's touch, and particularly, the touch screen 130 applied to the present invention is a mutual capacitive touch screen. The touch screen 130 includes the driving electrodes 131 and the sensing electrodes 132.

Each of the driving electrodes 131 is parallel to a gate line, and each of the sensing electrodes 132 is parallel to a data line. The driving electrodes 131 and the sensing electrodes 132 are formed in a lattice state, in the panel 100.

A plurality of driving electrode lines 133 connected to the respective driving electrodes 133 and a plurality of sensing electrodes connected to the respective sensing electrode lines 134 are formed in an inactive area B, and connected to the display driver IC 120 in the inactive area B. Hereinafter, a case in which the number of driving electrodes 131 is n number and the number of sensing electrodes 132 is m number will be described as an example.

The display driver IC 200 applies the driving pulse to the driving electrodes 131 and receives sensing signals from the respective the sensing electrodes 132, in the touch driving interval in which the panel 100 operates in a touch driving mode. The display driver IC 200 applies the common voltage Vcom to the driving electrodes 131 and the sensing electrodes 132 in the display driving interval in which the panel 100 operates in a display driving mode.

Moreover, the display drive IC 200 generates a gate control signal and a data control signal with a timing signal transferred from an external system and realigns input video data signals according to a pixel type of the panel 100, for displaying an image on the panel 100. To this end, the display driver IC 200 may include a gate driver that applies a scan signal to the gate lines, a data driver that applies image signals to the respective data lines, and a controller that controls the gate driver and the data driver.

Especially, the display driver IC 200 applies the driving pulse, having the common voltage as the minimum voltage, to the driving electrode 131 during the touch sensing period in the touch driving interval, and applies the reference voltage, which is used for touch sensing, to the driving electrode 131 during the touch non-sensing period in the touch driving interval. The display driver IC 200 performs the following function.

First, the display driver IC 200 outputs the common voltage to the driving electrodes 131 and sensing electrodes 132 formed in the panel 100, in the display driving interval.

Second, the display driver IC 200 outputs the reference voltage VRX_REF to the driving electrode 131 during the touch non-sensing period in the touch driving interval, and outputs a driving pulse (which swings with respect to the reference voltage VRX_REF) to the driving electrode 131 to receive respective sensing signals from the sensing electrodes 132 during the touch sensing period in the touch driving interval.

The touch sensing period denotes a period in which the driving pulse is actually applied to the driving electrode 131 and thus the sensing signals are respectively received from the sensing electrodes 132, in the touch driving interval. The touch non-sensing period denotes a period other than a period in which the driving pulse is outputted to the driving electrode 131, in the touch driving interval. In the touch driving interval, a period in which the driving pulse is applied to the driving electrode 131 is the touch sensing period, and the other period is the touch non-sensing period.

Here, the second operation (operation performed in the touch driving interval) includes an operation that outputs the reference voltage to the driving electrode 131 when the display driving interval is ended and the touch driving interval starts; an operation that outputs the driving pulse, having the minimum voltage lower than the reference voltage and the maximum voltage higher than the reference voltage, to the driving electrode 131 and receives sensing signals from the respective sensing electrodes 132, when a selection signal is received in the middle of outputting the reference voltage in the touch driving interval; and an operation that outputs the reference voltage to the driving electrodes 131 when the reception of the selection signal is stopped in the touch driving interval.

Here, the selection signal is a signal transferred from the touch IC 300 to the display driver IC 200, which outputs the reference signal or the common voltage to the driving electrodes 131 according to the selection signal.

An operation, in which the display driver IC 200 outputs the driving pulse to the driving electrode 131 and receives the sensing signals, includes: an operation that outputs the minimum voltage to the driving electrode 131 when the selection signal is received; an operation that outputs the driving pulse, whose the maximum voltage and the minimum voltage are repeated, to the driving electrode 131 after the minimum voltage is outputted; and an operation that receives the sensing signals from the respective sensing electrodes 132.

Third, the display driver IC 200 transfers the sensing signals, which are received through the operations, to the touch IC 300. The touch IC 300 determines whether there is a touch with the sensing signals.

The second operation, namely, the operation, in which the display driver IC 200 applies the reference voltage to the driving electrode 131 during the touch non-sensing period and outputs the driving pulse to the driving electrode 131 to receive the sensing signals during the touch sensing period, is sequentially performed for the other driving electrodes 131.

That is, the driving pulse is sequential applied to the driving electrodes 131 in the touch driving interval. At this point, the display driver IC 200 applies the reference voltage to the driving electrode 131 during the touch non-sensing period, and outputs the driving pulse to the driving electrode 131 during the touch sensing period.

The touch IC 300 transfers the control signal (which allows the display driver IC 200 to sequentially output the driving pulse to the driving electrodes 131) and the selection signal Tx_SEL for selecting the touch sensing period and the touch non-sensing period to the display driver IC 200, and senses whether there is a touch with the sensing signals and the reference voltage.

A detailed configuration of each of the display driver IC 200 and touch IC 300 performing the above-described functions will be described below in detail with reference to FIG. 3.

Figure 3:
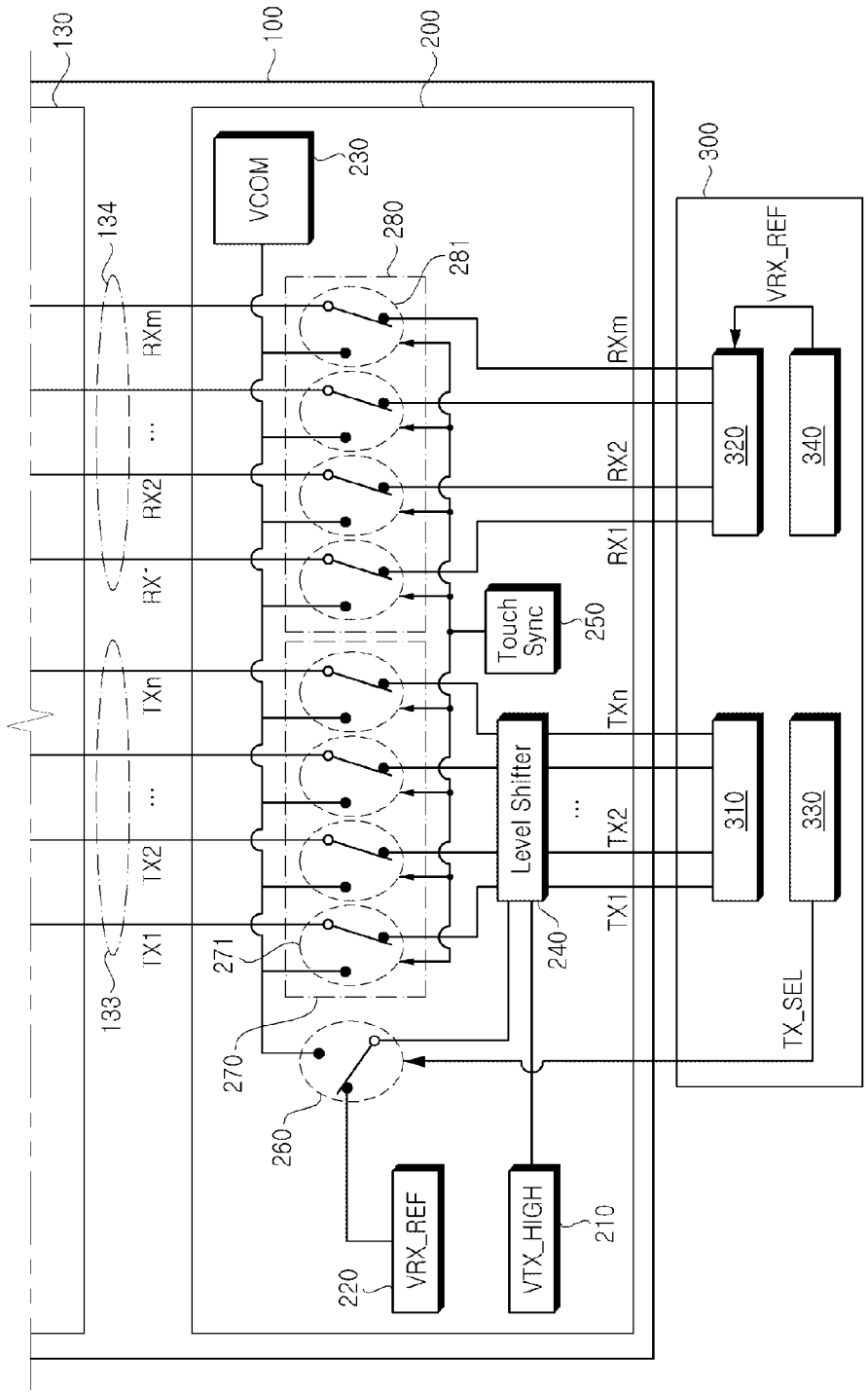
FIG. 3 is an exemplary diagram illustrating a detailed configuration of the display device according to an embodiment of the present invention.

FIG. 3 is an exemplary diagram illustrating a detailed configuration of the display device according to an embodiment of the present invention, and particularly illustrates a detailed configuration of each of the display driver IC 200 and touch IC 300.

When the display driving interval is ended and the touch driving interval starts, the display driver IC 200 outputs the reference voltage VRX_REF to the driving electrode 131, and, during the touch sensing period in which the selection signal Tx_SEL is received in the touch driving interval, the display driver IC 200 applies the driving pulse, having the minimum voltage VTX_LOW lower than the reference voltage VRX_REF and the maximum voltage VTX_HIGH higher than the reference voltage VRX_REF, to the driving electrode 131. When the touch sensing period is ended in the touch driving interval, the display driver IC 200 outputs the reference voltage VRX_REF to the driving electrode 131.

To this end, as illustrated in FIG. 3, the display driver IC 200 includes: a maximum voltage generator 210 that generates the maximum voltage VTX_HIGH of the driving pulse; a reference voltage generator 220 that generates the reference voltage VRX_REF; a common voltage generator 230 that generates the common voltage Vcom which is the minimum voltage VTX_LOW and is applied to the driving electrodes 131 and the sensing electrodes 132; a level shifter 240 that generates the driving pulse having the maximum voltage VTX_HIGH and the minimum voltage VTX_LOW according to the control signal; a selection switch 260 that outputs the reference voltage VRX_REF or the common voltage Vcom to the level shifter 240 according to the selection signal Tx_SEL; a driving electrode connector 270 that connects the common voltage generator 230 and the driving electrodes 131 in the display driving interval, and connects the level shifter 240 and the driving electrodes 131 in the touch driving interval; a sensing electrode connector 280 that connects the common voltage generator 230 and the sensing electrodes 132 in the display driving interval, and connects the touch IC 300 and the sensing electrodes 132 in the touch driving interval; and a touch synchronizer 250 that outputs a touch synch signal for differentiating the display driving interval and the touch driving interval to the driving electrode connector 270 and the sensing electrode connector 280.

The touch IC 300 includes a touch driver 310 that transfers the control signal to the level shifter 240, a selection signal generator 330 that transfers the selection signal Tx_SEL to the selection switch 260, a touch sensing unit 320 that receives the sensing signals to determine whether there is a touch, and a reference voltage transferer 340 that transfers the reference voltage VRX_REF to the touch sensing unit 320.

The maximum voltage generator 210 generates the maximum voltage VTX_HIGH of the driving pulse. The maximum voltage VTX_HIGH generated by the maximum voltage generator 210 is converted into the driving pulse by the level shifter 240, and applied to the driving electrodes 131.

The reference voltage generator 220 generates the reference voltage. The reference voltage is applied to the touch sensing unit 320 of the touch IC 300, and is a voltage which is used for touch sensing together with the sensing signals. The present invention also applies the reference voltage, which is applied to the sensing electrodes 132 and affects the sensing electrodes 132 connected to the touch sensing unit 320, to the driving electrodes 131. That is, the reference voltage generator 220 may generate the reference voltage to apply the reference voltage to the driving electrodes 131 through the level shifter 240, and also apply the reference voltage to the touch sensing unit 320. In this case, the reference voltage generator 340 included in the touch IC 300 outputs the reference voltage, transferred from the reference voltage generator 220, to the touch sensing unit 320. However, the reference voltage generator 340 may separately generate a reference voltage having the same level as that of the reference voltage generated by the reference voltage generator 220, and output the separately generated reference voltage to the touch sensing unit 320.

The common voltage generator 230 generates the common voltage Vcom to be applied to the driving electrodes 131 and the sensing electrodes 132. The minimum voltage VTX_LOW of the driving pulse outputted to the driving electrodes 131 is equal to the common voltage Vcom. That is, the minimum voltage of the driving pulse which is outputted during the touch sensing period in the touch driving interval substantially is the common voltage Vcom generated by the common voltage generator 230.

The level shifter 240 generates the driving pulse having the maximum voltage VTX_HIGH and the minimum voltage VTX_LOW according to the control signal transferred from the touch driver 330.

The selection switch 260 outputs the reference voltage or the common voltage to the level shifter 240 according to the selection signal transferred from the selection signal generator 330.

The selection switch 260 connects the level shifter 240 to the reference voltage generator 220 before the selection signal is changed to a high level in the touch driving interval and in the display driving interval.

Figure 4:
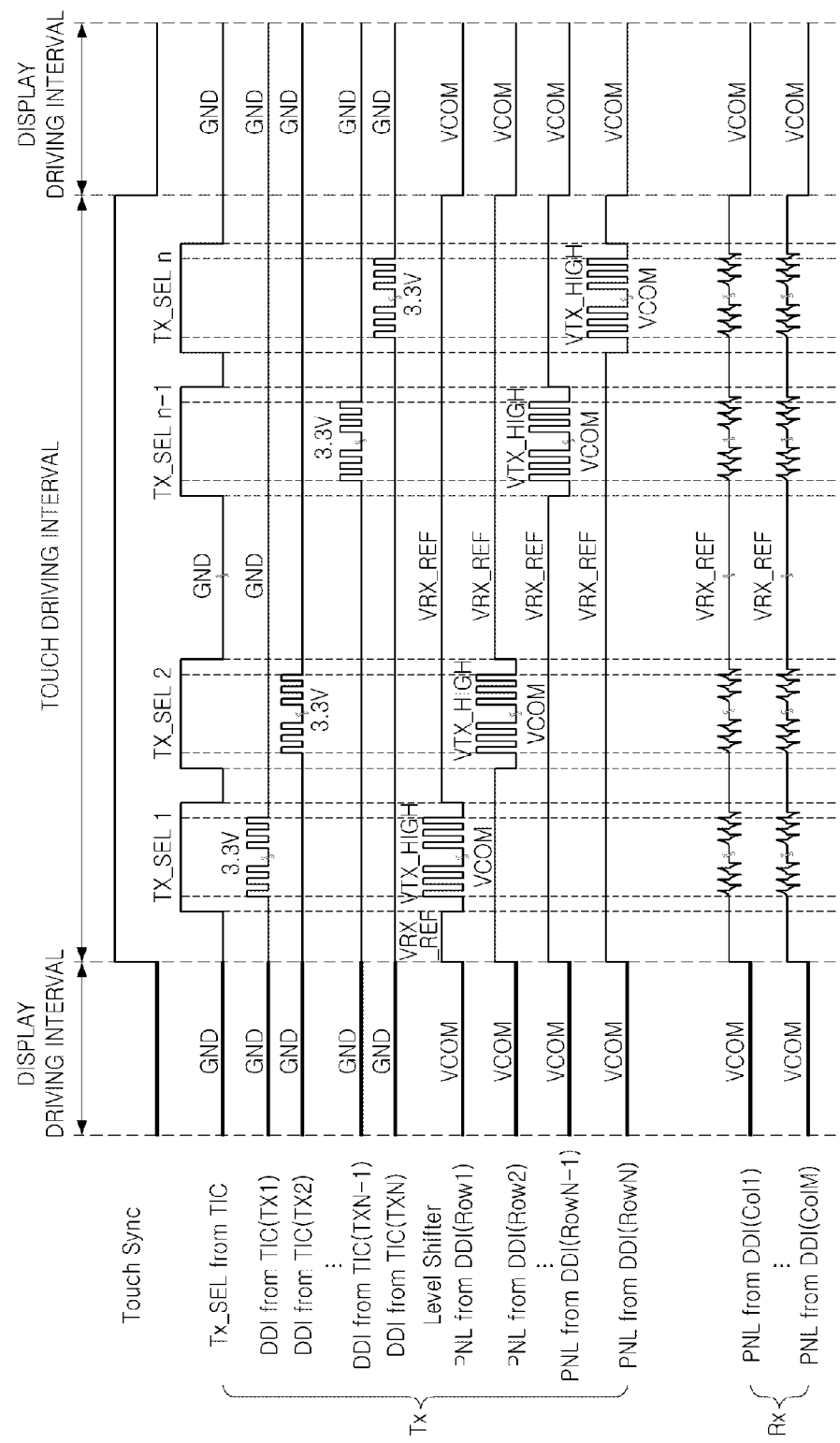
FIGS. 4 to 9 are various timing charts for describing a method of driving the display device according to an embodiment of the present invention.

As shown in FIG. 4, in the display driving interval, although the level shifter 240 is connected to the reference voltage generator 220 by the selection switch 260, since a driving electrode switch 271 is not connected to the level shifter 240, the reference voltage generated by the reference voltage generator 220 is not outputted to the common electrodes through the level shifter 240. In this case, since the driving electrodes 131 are connected to the common voltage generator 230 by the driving electrode switch 271, the common voltage is outputted to the driving electrodes 131.

Figure 5:
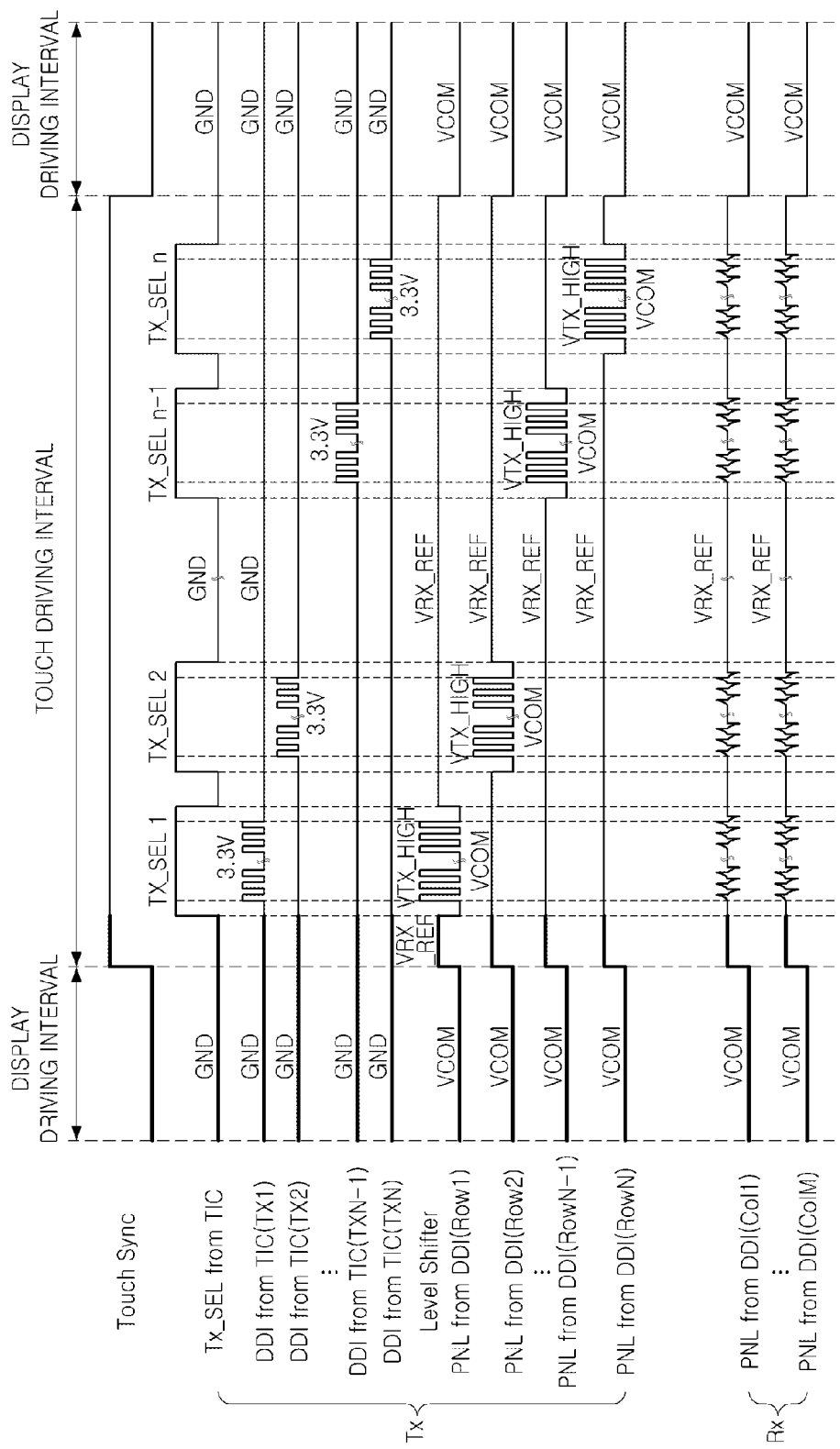

Moreover, as shown in FIG. 5, when the touch sync signal has a high level and the selection signal has a low level, the selection switch 260 connects the reference voltage generator 220 and the level shifter 240, thereby allowing the reference voltage to be outputted to the driving electrode 131 of the panel 100.

However, as shown in FIG. 4, when the touch sync signal has a high level and the selection signal has a high level, the selection switch 260 connects the common voltage generator 230 and the level shifter 240, thereby allowing the common voltage to be outputted as the minimum voltage of the driving pulse to the driving electrode 131.

The driving electrode connector 270 includes a plurality of driving electrode switches 271 disposed between the level shifter 240 and the driving electrode lines 133 connected to the respective driving electrodes 131, for connecting the common voltage generator 230 and the driving electrodes 131 in the display driving interval and connecting the level shifter 240 and the driving electrodes 131 in the touch driving interval. The driving electrode switch 271 connects the driving electrode line 133 and the level shifter 240 when the touch sync signal outputted from the touch synchronizer 250 has a high level, and connects the driving electrode line 133 and the common voltage generator 230 when the touch sync signal has a low level.

The sensing electrode connector 280 includes a plurality of sensing electrode switches 281 disposed between the touch sensing unit 320 and the sensing electrode lines 134 connected to the respective sensing electrodes 132, for connecting the common voltage generator 230 and the sensing electrodes 132 in the display driving interval and connecting the touch IC 300 and the sensing electrodes 132 in the touch driving interval. The sensing electrode switch 281 connects the sensing electrode line 134 and the touch sensing unit 320 when the touch sync signal outputted from the touch synchronizer 250 has a high level, and connects the sensing electrode line 134 and the common voltage generator 230 when the touch sync signal outputted from the touch synchronizer 250 has a low level.

The touch synchronizer 250 outputs the touch synch signal for differentiating the display driving interval and the touch driving interval to the selection switch 260, the driving electrode connector 270, and the sensing electrode connector 280.

Hereinafter, a method of driving the display device according to the present invention will be described in detail with reference to FIGS. 2 to 9.

FIGS. 4 to 9 are various timing charts for describing a method of driving the display device according to an embodiment of the present invention. In FIGS. 4 to 9, Touch Sync denotes the touch synch signal, Tx_SEL denotes the selection signal, a plurality of DDI from TIC denote the control signals, PNL from DDI denotes the driving pulse, and PNL from DDI denotes the reference voltage VRX_REF.

The plurality of DDI from TIC are control signals transferred from the touch IC 300 to the level shifter 240 of the display driver IC (DDI) 200, and the control signals are generated by the number (n) of driving electrodes 131.

The PNL from DDI denotes the driving pulse transferred from the level shifter 240 of the display driver IC (DDI) 200 to the driving electrodes 131 of the panel (PNL) 100, and is generated by the number (n) of driving electrodes 131.

The PNL from DDI denotes a signal transferred from the level shifter 240 of the display driver IC (DDI) 200 to the sensing electrodes 131 of the panel (PNL) 100. In the touch sensing period in which the driving pulse is applied to the driving electrode 131, the sensing signal is received from the sensing electrode 132 to the display driver IC (DDI) 200. In the touch non-sensing period, the reference voltage VRX_REF is applied to the sensing electrodes 132. In the display driving interval, the common voltage VCOM is applied to the sensing electrodes 132.

First, referring to FIG. 4, in the display driving interval, the common voltage VCOM is outputted from the display driver IC 200 to the driving electrodes 131 and sensing electrodes 132 of the panel 100. That is, the display driving interval is an interval in which an image is displayed by the panel 100, and the panel 100 outputs an image with the common voltage. When the panel 100 is a liquid crystal panel, the light transmittance of liquid crystal injected into the panel 100 is changed according to the common voltage applied to the driving electrodes 131 and the sensing electrodes 132 and data voltages applied to the panel 100, and thus, an image is outputted.

Second, referring to FIG. 5, when the low level of the touch sync signal is changed to a high level in the display driving interval, the selection switch 260 connects the reference voltage generator 220 to the level shifter 240.

However, as described above, the selection switch 260 may be continuously connected to the reference voltage generator 220 from the display driving interval, in which case the selection switch 260 may not perform a separate operation.

At this point, the driving electrode connector 270 connects the driving electrode lines 133 to the level shifter 240, and the sensing electrode connector 280 connects the sensing electrode lines 134 to the touch sensing unit 320.

Therefore, the reference voltage VRX_REF outputted from the reference voltage generator 220 is applied to the driving electrodes 131, and the reference voltage VRX_REF applied to the touch sensing unit 320 through the reference voltage transferer 340 is applied to the sensing electrodes 132. That is, reference voltages having the same level are applied to the driving electrodes 131 and the sensing electrodes 132.

Figure 6:
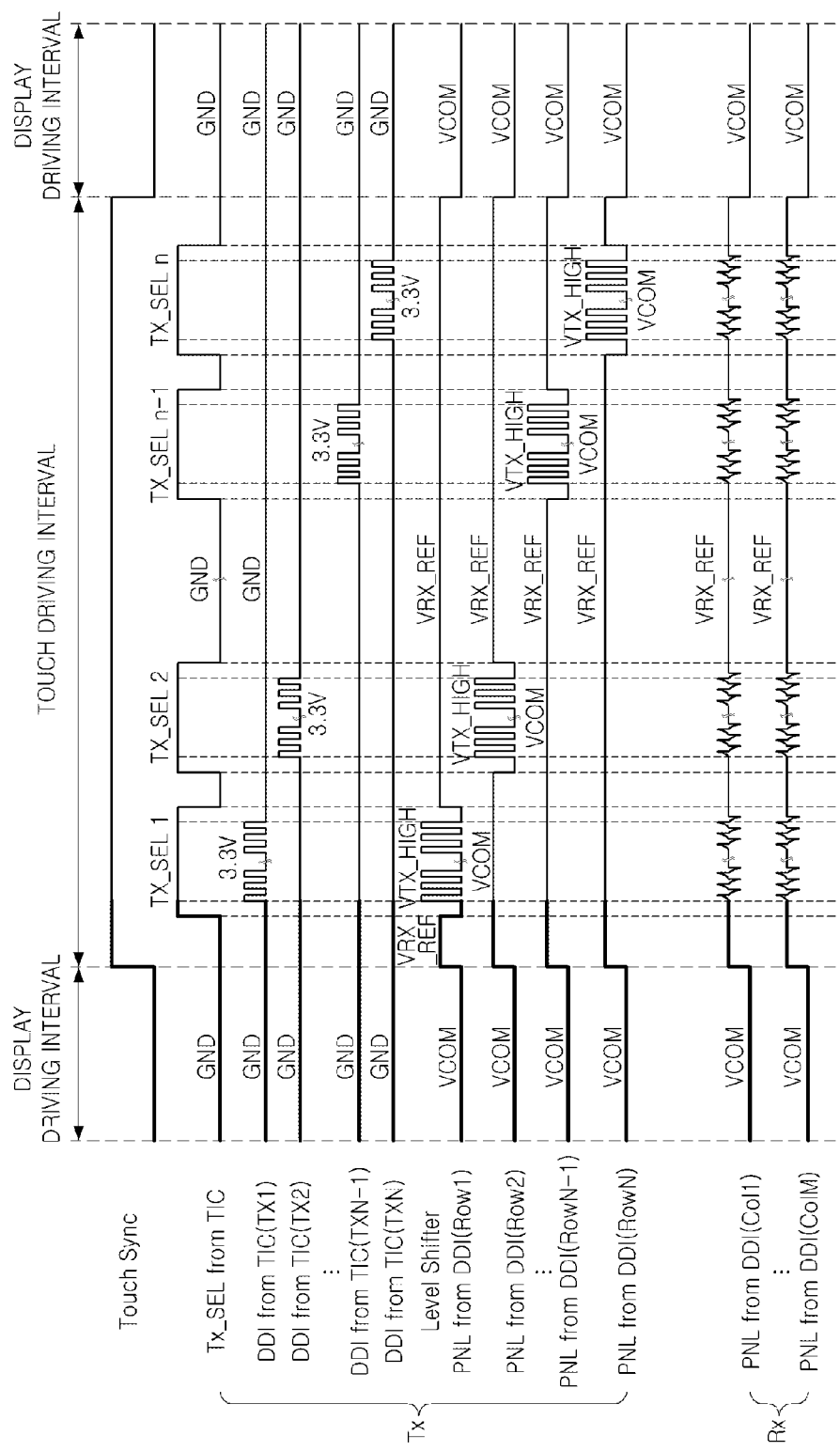

Third, referring to FIG. 6, with the touch sync signal having a high level, when a first selection signal Tx_SEL1 having a high level is received from the selection signal generator 330, the common voltage is applied to a first driving electrode (TX1=Row1) of the driving electrodes 131, and the reference voltage is continuously applied to the other driving electrodes TX2 to TXn.

Figure 7:
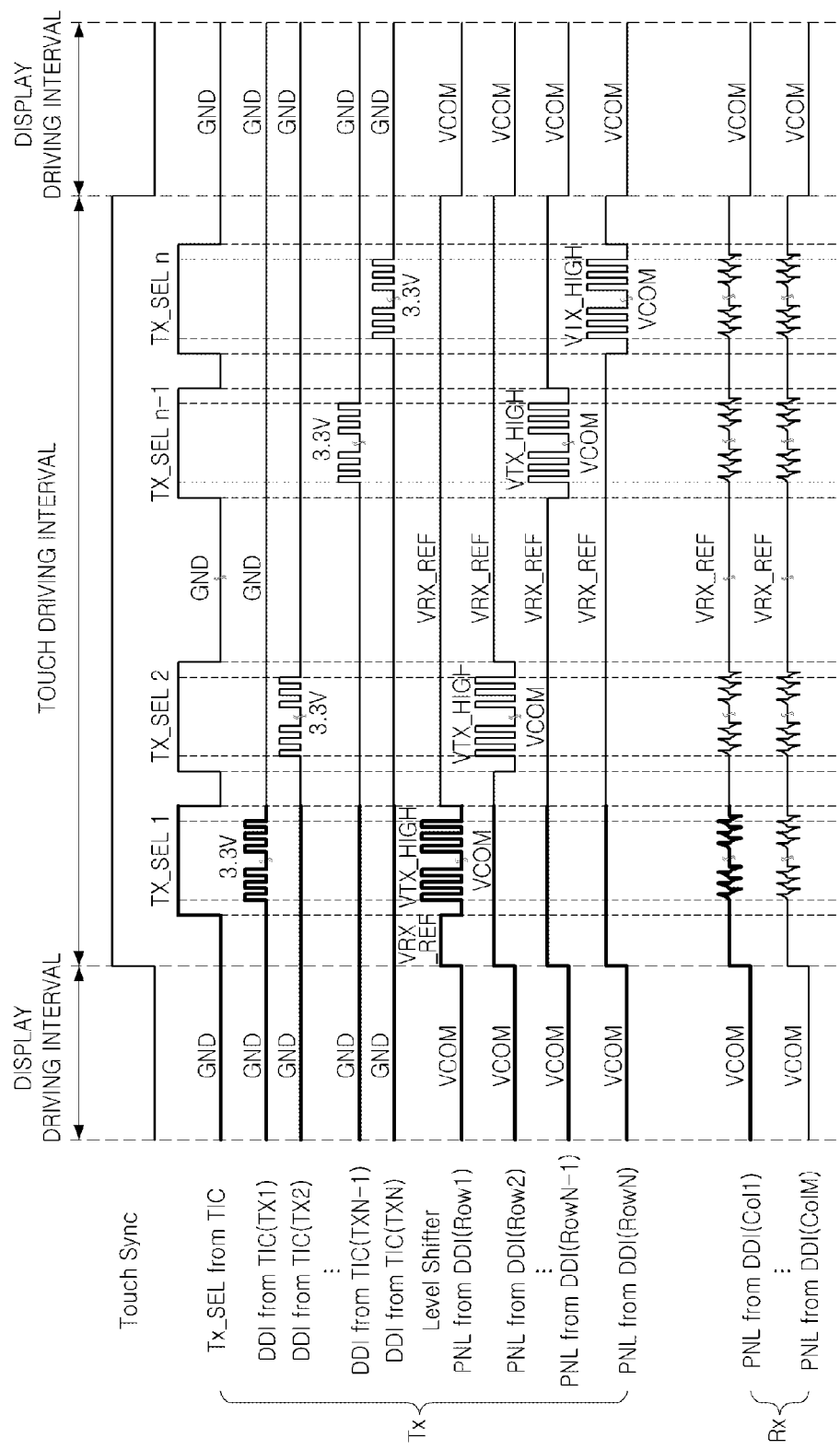

Fourth, referring to FIG. 7, with the touch sync signal having a high level, while the first selection signal Tx_SEL1 is maintained at a high level (touch sensing period), the level shifter 240 applies the driving pulse, having the common voltage VCOM as the minimum voltage VTX_LOW, to the first driving electrode (TX1=Row1), and continuously applies the reference voltage VRX_REF to the other driving electrodes TX2 to TXn.

In this case, a voltage difference between the maximum voltage VTX_HIGH and minimum voltage VTX_LOW of the driving pulse becomes the maximum value that the driving pulse may have. That is, the driving pulse may have the maximum voltage VTX_HIGH within a range higher by about 6 V than the common voltage, and, since the minimum voltage VTX_LOW is the common voltage, the maximum voltage and minimum voltage of the driving pulse becomes the maximum value that the driving pulse may have.

While the driving pulse is applied to the first driving electrode, the sensing signals are applied from the respective sensing electrodes 132 to the display driver IC (DDI) 200.

Figure 8:
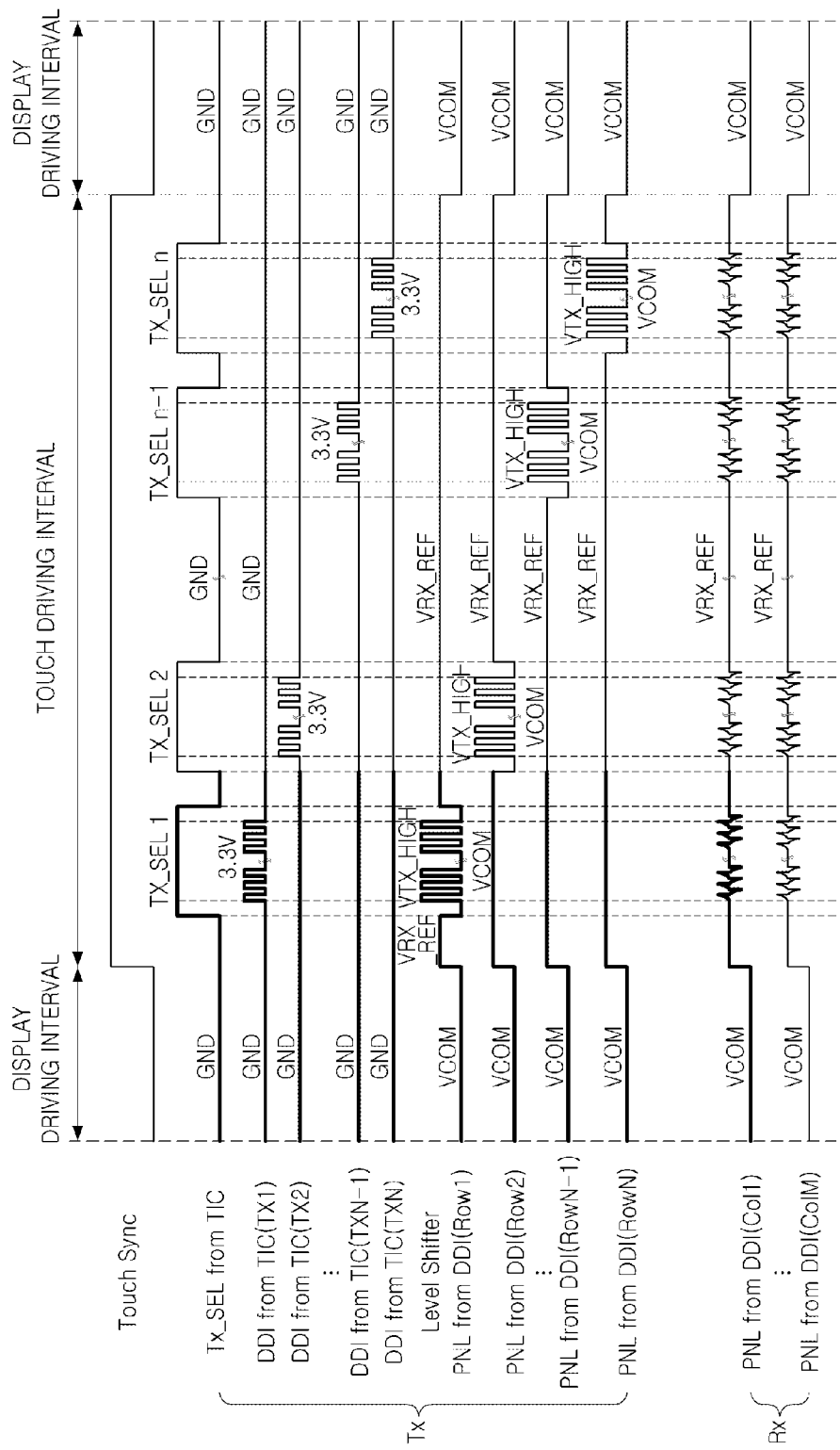

Fifth, referring to FIG. 8, with the touch sync signal having a high level, when the first selection signal is changed to a low level, the level shifter 240 applies the reference voltage to the first driving electrode (TX1=Row1) and the other driving electrodes.

The reference voltage is applied to the first driving electrode during all periods (touch non-sensing period) other than the touch driving interval.

Figure 9:
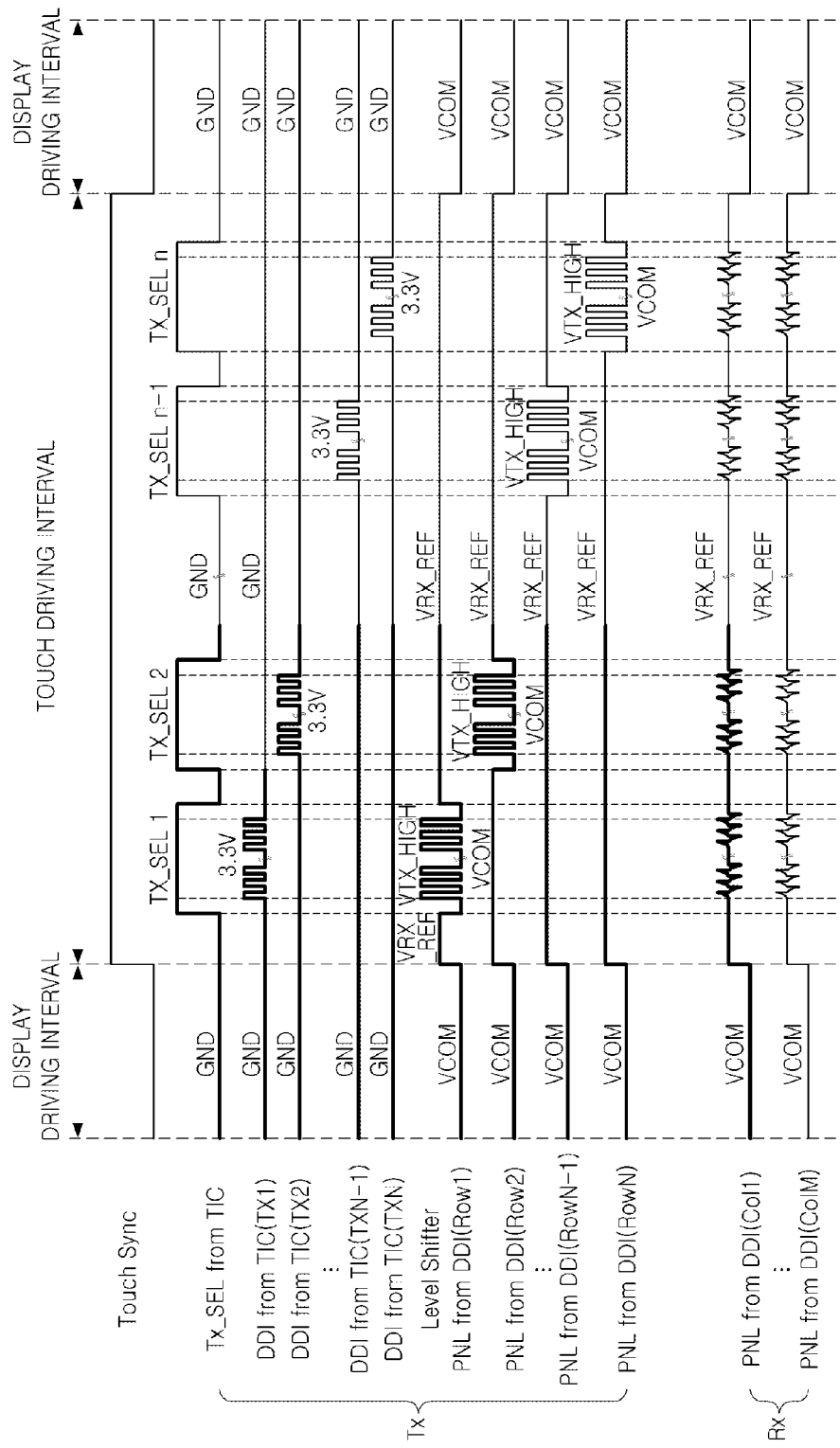

Sixth, referring to FIG. 9, with the touch sync signal having a high level, when a second selection signal Tx_SEL2 having a high level is transferred from the selection signal generator 330 to the display driver IC 300, the operation described above with reference to FIGS. 6 to 8 is performed on a second driving electrode (TX2=Row2) of the driving electrodes 131.

Subsequently, the operation described above with reference to FIGS. 6 to 8 is performed on third to nth driving electrodes (TX3=Row3) to (TXn=Rown).

In this case, the sensing signals are inputted from the respective sensing electrodes 132 to the touch sensing unit 320 through the display driver IC 200, and the touch sensing unit 320 determines whether there is a touch with the sensing signals.

The selection signal Tx_SEL is a signal generated by the touch IC 300, is a 1-bit logic signal, and has pulse driving interval information by channel. Also, the selection signal includes a standby time necessary for switching a voltage to the driving electrode 131. That is, as shown in FIG. 6, due to the standby time, even when the first selection signal Tx_SEL1 is changed to a high level, the driving pulse is not immediately outputted, and, as shown in FIG. 7, even when the first selection signal Tx_SEL1 is changed to a low level, the reference voltage is not immediately outputted.

As described above, the present invention applies a reference voltage, which is equal to a reference voltage applied to the sensing electrodes 132, to the driving electrodes 131 during the touch non-sensing period having the most time of the touch driving interval, and therefore decreases a voltage difference between the driving electrodes 131 and the sensing electrodes 132, thus preventing block dim in the panel 100.

The present invention maximizes the amplitude of the driving pulse by using the minimum voltage VTX_LOW of the driving pulse as the common voltage, thus enhancing touch sensing performance.

The present invention applies the driving pulse, having the common voltage as the minimum voltage, to the driving electrode during a touch sensing period in the touch driving interval, and applies the reference voltage, which is used for touch sensing, to the driving electrode during a touch non-sensing period in the touch driving interval, thus minimizing a voltage difference between the driving electrode and the sensing electrode to thereby prevent block dim.

Moreover, the present invention maximizes the amplitude of the driving pulse by using the minimum voltage of the driving pulse as the common voltage, thus enhancing touch sensing performance.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device, comprising:
   a panel comprising a plurality of driving electrodes and a plurality of sensing electrodes;
   a display driver IC outputting a common voltage to the driving electrode and the sensing electrode in a display driving interval, outputting a reference voltage to the driving electrode during a touch non-sensing period in a touch driving interval, and outputting a driving pulse to the driving electrode to receive a sensing signal from the sensing electrode during a touch sensing period in the touch driving interval, the driving pulse swinging with respect to the reference voltage; and
   a touch IC transferring a control signal and a selection signal for selecting the touch sensing period and the touch non-sensing period to the display driver, and sensing whether there is a touch with the sensing signal and the reference voltage, the control signal allowing the display driver IC to sequentially output the driving pulse to the driving electrodes,
   wherein a minimum voltage of the driving pulse is the same as the common voltage.

2. The display device of claim 1, wherein,
   when the display driving interval is ended and the touch driving interval starts, the display driver IC outputs the reference voltage to the driving electrode,
   in the touch sensing period where the selection signal is received in the touch driving interval, the display driver IC outputs the driving pulse, having a minimum voltage lower than the reference voltage and a maximum voltage higher than the reference voltage, to the driving electrode, and
   when the touch sensing period is ended in the touch driving interval, the display driver IC outputs the reference voltage to the driving electrode.

3. The display device of claim 1, wherein the display driver IC comprises:
   a maximum voltage generator generating a maximum voltage of the driving pulse;
   a reference voltage generator generating the reference voltage;
   a common voltage generator generating the common voltage that is the minimum voltage;
   a level shifter generating the driving pulse having the maximum voltage and a minimum voltage according to the control signal in the touch sensing interval, and outputting the reference voltage to the driving electrode in the touch non-sensing period;
   a selection switch outputting the reference voltage or the common voltage to the level shifter according to the selection signal;
   a driving electrode connector connecting a common voltage generator and the driving electrodes in the display driving interval, and connecting the level shifter and the driving electrodes in the touch driving interval;
   a sensing electrode connector connecting the common voltage generator and the sensing electrodes in the display driving interval, and connecting the touch IC and the sensing electrodes in the touch driving interval; and
   a touch synchronizer outputting a touch synch signal for differentiating the display driving interval and the touch driving interval to the driving electrode connector and the sensing electrode connector.

4. The display device of claim 3, wherein the touch IC comprises:
   a touch driver transferring the control signal to the level shifter;
   a selection signal generator transferring the selection signal to the selection switch;
   a touch sensing unit receiving the sensing signal to determine whether there is a touch; and
   a reference voltage transferer transferring the reference voltage to the touch sensing unit.

5. A method of driving a display device, comprising:
   outputting a common voltage to a driving electrode and a sensing electrode in a display driving interval, the driving electrode and the sensing electrode being formed in a panel;
   applying a reference voltage to the driving electrode during a touch non-sensing period in a touch driving interval, and outputting a driving pulse to the driving electrode to receive a sensing signal from the sensing electrode during a touch sensing period in the touch driving interval, the driving pulse swinging with respect to the reference voltage; and
   sensing whether there is a touch with the sensing signal,
   wherein a minimum voltage of the driving pulse is the same as the common volt age, and
   the touch sensing period and the touch non-sensing period is selected by a selection signal.

6. The method of claim 5, wherein the applying of a reference voltage and outputting of a driving pulse comprises:
   outputting the reference voltage to the driving electrode when the display driving interval is ended and the touch driving interval starts;
   outputting the driving pulse, having a minimum voltage lower than the reference voltage and a maximum voltage higher than the reference voltage, to the driving electrode when a selection signal is received in the middle of outputting the reference voltage in the touch driving interval; and
   outputting the reference voltage to the driving electrode when reception of the selection signal is stopped in the touch driving interval.

7. The method of claim 6, wherein the outputting of a driving pulse to the driving electrode to receive a sensing signal comprises:
   outputting the minimum voltage to the driving electrode when the selection signal is received;
   outputting, after the minimum voltage is outputted, the driving pulse to the driving electrode, the maximum voltage and minimum voltage of the driving pulse being repeated; and
   receiving the sensing signal from the sensing electrode.

8. The method of claim 5, wherein the applying of a reference voltage to the driving electrode during a touch non-sensing period and the outputting of a driving pulse to the driving electrode to receive a sensing signal during a touch sensing period is sequentially performed for the other driving electrodes.

* * * * *